ELECTRONIC DECODER

Filed Dec. 24, 1958 2 Sheets-Sheet 1

INVENTOR.
HARRY R. LORD

BY Ralph R. Barnard
ATTORNEY

| BINARY CODED NUMBER | EQUIVALENT DECIMAL NUMBER |
|---|---|
| 0 0 0 | 0 |
| 0 0 1 | 1 |
| 0 1 0 | 2 |
| 0 1 1 | 3 |
| 1 0 0 | 4 |
| 1 0 1 | 5 |
| 1 1 0 | 6 |
| 1 1 1 | 7 |

United States Patent Office 3,088,104 Patented Apr. 30, 1963

3,088,104

ELECTRONIC DECODER

Harry R. Lord, Endicott, N.Y., assignor to International Business Machines Corporation, New York, N.Y., a corporation of New York Filed Dec. 24, 1958, Ser. No. 782,753
8 Claims. (Cl. 340—347)

Figure 3:
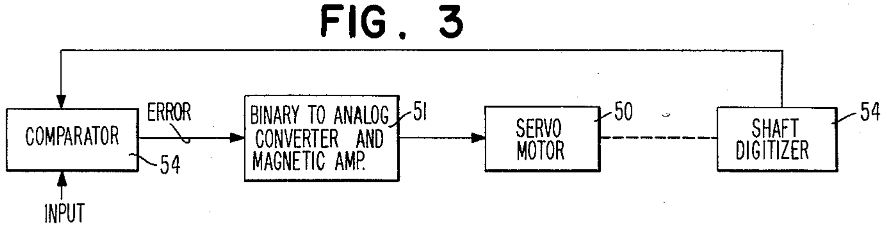

The present invention generally relates to an electrical decoder, and in particular, it relates to a new and improved means for converting binary electrical information to an analog electrical quantity, which is a selected non-linear function of the binary input information.

In the field of electronic digital computers, the output information from the digital computer usually must be converted into an analog form before it may be utilized as read out information or to function as a control quantity. Means for converting electrical binary information to electrical analog information are known in the art, and two generalized approaches have been utilized for that purpose. One of the approaches is known as the voltage summing, and the other is known as current summing. It is the latter approach with which the present invention is concerned.

An example of the use of current summing for the purpose of providing a binary-to-analog conversion is shown in FIG. 14, page 31, IBM Journal of Research and Development, volume 2, No. 1, January 1958. Therein, a sample impedance and a variable resistance network, comprising plural parallel resistance paths each containing a diode, are connected in series with a source of D.C. voltage. Each of the diodes contained in the plural parallel resistance paths are oriented to be forwardly biased by the D.C. source. The number of plural parallel resistance paths is made equal to the number of orders of significance in the binary information to be converted and the resistance thereof is selected according to the inverse of the binary weighting. Moreover, plural triggers corresponding in number to the number of orders of significance of the binary information are utilized to selectively back bias the diodes in each parallel path in accordance with the binary information to be converted. As a result of proper switching of said trigger means in accordance with the binary information, each of the aforementioned plural parallel paths will selectively contribute a current to a sampling impedance, so that the sum of the currents passing through the sampling impedance is representative of the analog of the binary input information.

This technique of the prior art is satisfactory in many respects. However, there are many engineering applications where is is desired that the sum of the current passing through the sampling impedance be utilized to control a non-linear device, such as a magnetic amplifier, so that the output thereof is either linear or alternatively non-linear in a desired manner with respect to the binary input information. It is often highly desirable that the summation analog current passing through the sampling impedance is a particular non-linear function of the binary input information.

As those skilled in the art will recognize, it is known to weight the resistance contained in each parallel path according to the binary significance associated with that path and to produce a summation current within an output impedance corresponding to the sum of the currents within separate paths for those decimal numbers represented by the summation of the binary weightings one, two, four, etc. ($2^0$, $2^1$, $2^2$, etc.). However, if it were desired to adjust the binary weighting of each path according to a particular non-linear relationship between the binary and desired analog output current, it will no longer be possible to sum the currents passing through the resistance paths corresponding to decimal numbers one, two, four, etc. to obtain a summation current corresponding to decimal numbers three, five, six and seven.

Accordingly, the present invention teaches a technique whereby additional parallel paths responsive to the binary input information are utilized to provide the additional non-linear increment required when combining the non-linear weighted currents passing through the paths corresponding to decimal numbers one, two, four, etc. This sum current, representing a non-linear analog of the binary input information, may then be used as a control quantity in those electrical devices which respond to either a direct current or a D.C. voltage. These electrical devices may be either of a linear or non-linear type. By way of example, the teachings of the present invention may be applied to a magnetic amplifier to provide a large power A.C. analog output in accordance with a selected non-linear function of the binary electrical information. A sum current may be passed through the control winding of a magnetic amplifier for that purpose.

Accordingly, it is a primary object of the present invention to provide a new and improved means for converting binary electrical information to an analog electrical current, which is a selected non-linear function of the binary input information.

It is an additional object of the present invention to provide a new and improved means for converting binary electrical information to a D.C. analog electrical control current, which may be utilized to determine the instantaneous magnitude of an A.C. output voltage.

It is still another object of the present invention to provide a new and improved means for converting binary electrical information to a D.C. analog current, which may be used to control an A.C. voltage output operating at a high power level.

Other objects of the invention will be pointed out in the following description and claims and illustrated in the accompanying drawings, which disclose, by way of examples, the principles of the invention and the best mode which has been contemplated of applying that principle.

Figure 1:
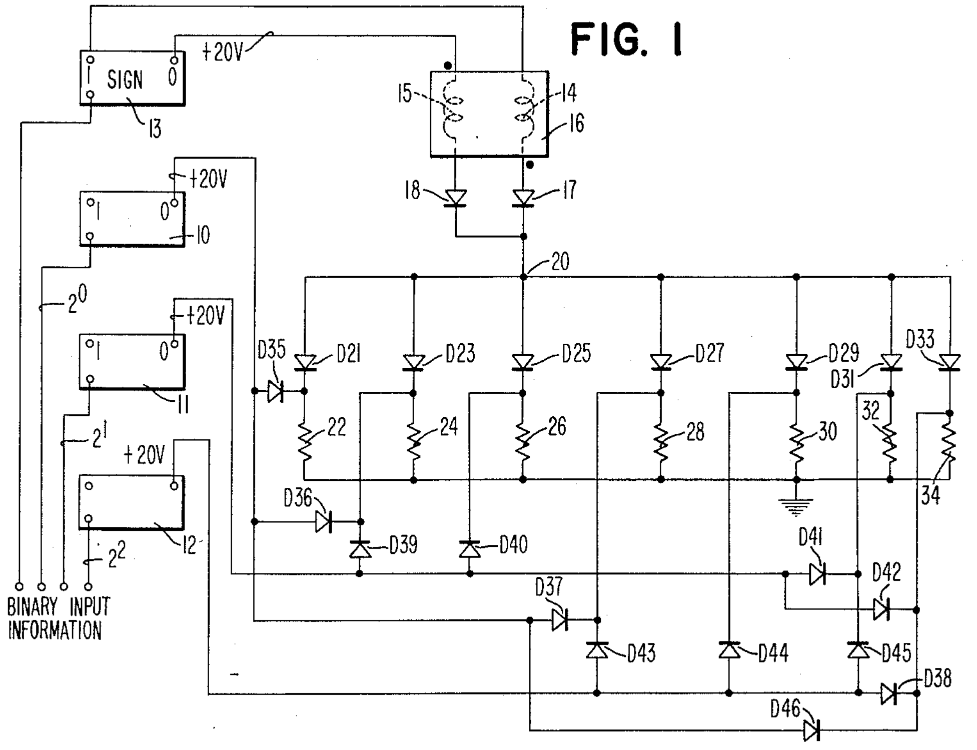
Figures 2A, 2B:
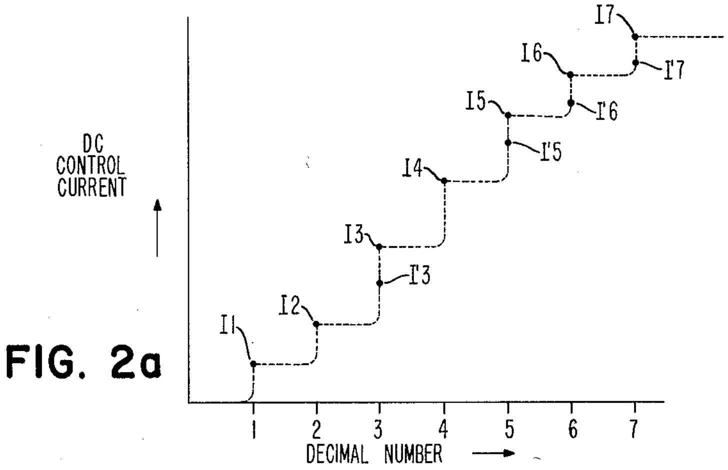

FIG. 1 shows an electrical schematic of the technique of the present invention being utilized to convert binary electrical information to a D.C. analog current passing through one of the control windings of a magnetic amplifier;

FIG. 2*a* is a plot of a typical non-linear relationship of the resultant sum current passing through a sampling impedance versus decimal numbers corresponding to binary electrical input information;

FIG. 2*b* shows a table relating typical binary electrical input information with their equivalent number; and FIG. 3 shows a block diagram of a digital servo which may, by way of example, incorporate the digital-analog converter shown in FIG. 1.

Briefly, the present invention comprises a technique for converting a source of binary electrical input information stored within electrical latches 10, 11 and 12 of FIG. 1 which it is desired to convert to an analog direct current passing through a sampling impedance comprising either control windings 14 or 15 of magnetic amplifier 16 shown in block form. This decoding is provided by applying a source of D.C. voltage to either of windings 14 or 15 from the output terminals of a sign latch 13 and connecting the common terminal of windings 14 and 15 in series with a variable resistance network comprising plural parallel resistance paths. Each of these plural parallel paths have a diode connected therein, which is oriented to be forwardly biased by the D.C. voltage provided by latch 13. Finally, the above-referred to latches 10, 11 and 12 have their outputs appropriately connected to the several parallel paths at one terminal of the diode connected therein, so as to selectively back bias the diodes in accordance with the binary electrical input information. Unlike the prior art, since sufficient parallel paths (7) are provided to correspond to the number of decimal numbers, which may be represented by the binary information contained in latches 10, 11 and 12, a total resistance may be selected so that the analog direct current passing through the sampling impedance (selected winding) is according to the desired non-linear function of the binary input information.

When it is desired to control a magnetic amplifier, it will be noted that the selected non-linear function will be determined in part by the linearity between the action of the control winding in its effect on the output winding of the magnetic amplifier and the desired non-linearity between the binary input quantity and the magnetic amplifier output winding.

Referring again to FIG. 1, the sampling impedance may be either control winding 14 or 15 of magnetic amplifier 16 as determined by sign latch 13. As shown, the 1 output terminal of sign latch 13 is connected to one terminal of control winding 14, and the 0 output terminal thereof is connected to one terminal of control winding 13. Assuming that latch 13 is designed so that when it is in a reset condition, the 0 output terminal will be at +20 volts, and the 1 output terminal is at the D.C. ground voltage level; the 1 output terminal will go to +20 volts, and the 0 output terminal will go to the D.C. ground voltage level when it is down to a set condition. Accordingly, latch 13 can be driven to its set or reset condition depending on which control winding it is desired to select. As those skilled in the art know, it is common in magnetic amplifiers to use one control winding to control the amplitude of an A.C. output voltage having a first phase and a second control winding to control the amplitude of an A.C. output voltage having the other phase.

Connected in series with each of these windings are isolation diodes 17 and 18 oriented to be forwardly biased by the +20 volts. The windings 14 and 15 are then commoned at a junction 20 and then connected in series with the variable resistance network comprising seven parallel resistance paths. The first parallel resistance path is shown comprising diode D21 and resistance 22; the second parallel resistance path is shown comprising diode D23 and resistance 24; the third parallel resistance path is shown comprising diode D25 and resistance 26; the fourth parallel resistance path is shown comprising diode D27 and resistance 28; the fifth parallel resistance path is shown comprising diode D29 and resistance 30; the sixth parallel resistance path is shown comprising diode D31 and resistance 32; and the seventh parallel resistance path is shown comprising diode D33 and resistance 34. The other terminal of each of these resistances is then commoned and connected to D.C. ground as shown. Diodes D21, D23, D25, D27, D29, D31 and D33 are oriented to be forwardly biased by the +20 volts being applied to junction 20 via either winding 14 or winding 15.

Assuming the binary electrical input information as being defined by three orders of binary significance, conventional latches 10, 11 and 12 may be utilized for defining this information. Accordingly, latch 10 may be utilized to represent the lowest order of binary significance corresponding to a decimal weighting of one; latch 11 may be utilized to represent the next higher order of binary significance corresponding to a decimal weighting of two; and latch 12 may be utilized to represent the next higher order of binary significance corresponding to a decimal weighting of four. If each of these latches are initially in a reset condition corresponding to a binary "0" stored therein, these latches may be designed so that their 0 output terminal has a voltage level of +20 volts thereon equal to the voltage being applied to junction 20 by latch 13. Therefore, if the common terminal between the diode and the resistance within each parallel path is connected to the 0 output terminal of one of these latches when that latch is representing a binary "0," the diode connected therein will be back biased, and that resistance parallel path will not pass any current.

As shown, the 0 output terminal of latch 10 is connected to the common terminal between D21 and resistance 22 through diode D35, to the common terminal of D23 and resistance 24 through diode D36, to the common terminal of D27 and resistance 28 through diode D37, and to the common terminal of D33 and resistance 34 through diode D38. Similarly, the 0 output terminal of latch 11 is connected to the common terminal of D23 of resistance 24 through diode D39, to the common terminal of D25 and resistance 26 through diode D40, to the common terminal of D31 and resistance 32 through diode D41, and to the common terminal of D33 and resistance 34 through diode D42. Likewise, the 0 output terminal of latch 12 is connected to the common terminal of D27 and resistance 28 through diode D43, to the common terminal of D29 and resistance 30 through diode D44, to the common terminal of D31 and resistance 32 through diode D45, and to the common terminal of D33 and resistance 34 through diode D46. It should be noted that diodes D35 through D46 are oriented to be forwardly biased when a +20 volts is applied from the corresponding 0 output terminal of the latch connected thereto.

According to the technique of the prior art which provided for the conversion of binary electrical information to an analog direct current with a linear relationship therebetween, only three parallel resistance paths, such as D21 and resistance 22, D25 and resistance 26, D29 and resistance 30, would have been required. Resistances 22, 26 and 30 could each have been chosen to contribute a current through the selected winding in accordance with the binary significance and decimal numbers one, two, four, etc. of the latch connected thereto. For example, when latch 10 is driven to its set condition corresponding to a binary "1," its 0 ouput terminal would go to the D.C. ground level, so that D21 is no longer back biased, and resistance 22 will contribute a current commensurate with the decimal one through the selected winding. When latch 11 is driven to its set condition corresponding to a binary "1," its 0 output terminal would go to the D.C. ground voltage level, so that D25 would no longer be back biased and resistance 26 will contribute a current commenusurate with the decimal two through the selected winding. Similarly, when latch 12 is driven to its set state, its 0 output terminal will go the D.C. ground voltage level and D29 would no longer be back biased, and resistance 30 would contribute a current commensurate with the decimal four through the selected winding. When it is desired to have an analog direct current passing through the selected winding which has a linear relationship, the parallel path including resistance 22 can coact with the parallel resistance path including resistance 26, in response to the action of latches 10 and 11, to provide a sum current through the selected winding commensurate with decimal three. Similarly, the resistance path including resistance 22 can coact with the resistance path including resistance 28, in response to the action of latches 10 and 12, to provide a sum current through the selected winding commensurate with decimal five. Furthermore, the resistance path including resistance 26 can coact with the reistance path including resistance 30, in response to latches 11 and 12, to provide a sum current through the selected winding commensurate with decimal six or the resistance paths including resistances 22, 26 and 30 can coact in response to latches 10, 11 and 12 to provide a sum current through the selected winding commensurate with decimal seven.

However, if a non-linear relationship is desired between the binary electrical information operating the latches and the analog direct current passing through the selected winding, resistances 22, 26 and 30 will no longer be chosen to contribute a current commensurate with decimals one, two and four but will be selected in accordance with the particular non-linearity desired. Referring to FIG. 2*a*, such a non-linear relationship is shown by the plotting of points I1, I2, I3, I4, I5, I6 and I7 representing analog D.C. incremental control currents passing through the selected winding as the ordinate versus decimal numbers one, two, three, four, five, six and seven on the abscissa as defined by the binary electrical input information being applied to latches 10, 11 and 12. FIG. 2*b* shows a table relating to this binary electrical input information with their equivalent decimal number.

For example, assuming the binary electrical input information is a 001 corresponding to a decimal one, latch 10 is driven to its set condition, and latches 11 and 12 remain in their reset condition. As a result, diode D21 is no longer back biased, and the resistance path including resistance 22 contributes a current through the selected winding. In order to obtain the non-linear relationship set forth in FIG. 2*a*, the magnitude of resistance 22 is selected so that that path will contribute a current equal to I1. It should be noted that under these conditions, latch 11 continues to back bias D23 through D39 even though latch 10 is no longer performs that function. Similarly, diodes D27 through D33 are maintained in their back bias condition by the action of latches 11 and 12.

Furthermore, assuming that the binary electrical input information is equal to 010, corresponding to a decimal two, latch 11 goes to its set condition, and latches 10 and 12 remain in their reset condition, with the result that diode D25 is no longer back biased. The resistance path including resistance 26 is accordingly selected so as to contribute a current through the selected winding equal to I2, shown in FIG. 2*a*. It should be noted that D21 and D23 are maintained in a back bias condition by latch 10 through D35 and 36. Similarly, D27, D29, D31 and D33 are maintained in their back biased condition by either latches 10 or 12, or both, through the isolating diodes shown.

When the binary electrical input information is 011, corresponding to a decimal three, both latches 10 and 11 are driven into their set conditions, and latch 12 is maintained in its reset condition. Latch 10 acts through D35 to allow D21 to be forwardly biased, and latch 11 acts through D40 to allow D25 to be forwardly biased. Since the magnitudes of resistances 22 and 26 have been selected in accordance with the values I1 and I2 desired, the non-linear relationship depicted in FIG. 2*a* is such that the sum of these will be equal to I'3 and not I3, as desired. In order to provide the incremental current through the selected winding corresponding to the difference between I3 and I'3, latches 10 and 11 also act through D36 and D39 so that D23 is no longer back biased. Thus, the magnitude of resistance 24 may be selected so as to contribute a current equal to the incremental correction required.

Similarly, when the binary electrical input information is 101, representing a decimal five, latches 10 and 12 are driven to their set conditions and the parallel resistance path including D27 acts to contribute a current equal to the difference between I5 and I'5. This action is required because of the non-linear relationship shown in FIG. 2*a*. The currents I1 and I4 when summed are equal to I'5 and not I5.

Likewise, the resistances 32 and 34 in the parallel paths, including D31 and D33, respectively, may be selected to provide correction factors between points I'5 and I6 and points I'7 and I7. The over-all approach for scaling any non-linear relationship desired is to select resistances 22, 26 and 30 according to the currents I1, I2 and I4 with which it is desired to represent decimal numbers one, two and four, respectively, and utilize additional parallel resistance paths to provide the necessary correction factors when summing the currents in two or more of these paths to obtain currents equal to I3, I5, I6 and I7 as desired. It should be noted that diodes D35 through D46 provide an isolation function between the parallel paths and latches.

A digital-to-analog converter as described hereinabove in connection with FIG. 1 may be utilized to an advantage within a digital servo system such as that shown in block form in FIG. 3. Because the servo motor 50 within such a system normally requires a considerable amount of power, it is often very convenient to utilize a magnetic amplifier in its input. Accordingly, in FIG. 3, the digital-to-analog converter and magnetic amplifier 51 may be of the same designs as that shown in FIG. 1. Conventionally, in a digital servo, a comparator circuit 52 will derive a binary electrical error quantity which has several orders of a significance in response to a binary electrical input and the output of a shaft digitizer; whereas, the input information and shaft digitizer may include binary information of many orders of significance. The binary electrical error information is then converted to an analog control quantity so as to drive a servo motor 50 through an amplifier in a direction determined by the sign of the error and at a speed determined by the magnitude of the error. The servo motor 50 in turn drives the shaft digitizer, which modifies the error derived by the comparator. It is a well known design practice to select the relationship between the binary electrical error information and the analog control quantity in a particular non-linear fashion to provide a desirable amount of system stability. The teachings of the present invention are usable for that purpose but not limited thereto. Servo motor 50, shaft digitizer 54 and comparator 52 are well known electrical components. The details thereof form no part of the present invention.

Latches 10, 11, 12 and 13, shown in FIG. 1, are conventional and may be either electrical or mechanical. Alternatively, these devices may be any of the well known electrical switching means performing the functions described herein.

Notwithstanding the fact that the typical non-linear relationship shown in FIG. 2*a* is one having both a positive and increasing slope, the teachings of the present invention are not limited thereto when a multiple control winding device like a magnetic amplifier is being used. For example, if a decreasing or negative slope is desired, a person skilled in the art could utilize the teachings of the present invention to add two additional control windings to magnetic amplifier 16 of FIG. 1. One of these may be wound in the same manner and connected to the same source as winding 14 but in a reverse sense, and the other may be wound in the same manner and connected to the same source as winding 15 but in a reverse sense. These windings may be selectively energized simultaneously with either winding 14 or winding 15 and connected in a series relationship with a variable resistance network comprising one or more parallel resistance paths. These resistance paths may each contain a diode which is normally forwardly biased by the energization of the selected winding and selectively back biased by electrical switching circuitry providing an on-off voltage source in accordance with the binary electrical input information to be converted. Because the current flow through the extra winding will have an opposite effect on the output of magnetic amplifier 16 as does the selected winding 14 or 15, negative slopes may be obtained in the magnetic amplifier output characteristic.

While there have been shown and described and pointed out the fundamental novel features of the invention as applied to a preferred embodiment along with several specific modifications, it will be understood that many additional omissions and substitutions and changes in the form and details of the device illustrated in its operation may be made by those skilled in the art, without departing from the spirit of the invention. It is the intention, therefore, to be limited only as indicated by the scope of the following claims.

What is claimed is:

1. An electrical decoder means comprising a source of binary electrical input information, a sampling impedance, a variable resistance network, a source of D.C. voltage, a D.C. ground, said sampling impedance and said variable resistance network being connected in series between said source of D.C. voltage and D.C. ground, said variable resistance network comprising plural parallel resistance paths, each having a diode connected therein, said diodes being oriented to be forwardly biased by said D.C. source, logic switching means responsive to said source of binary electrical information connected to one terminal of the diode within each parallel path so as to selectively back bias said diodes in accordance therewith, said total variable resistance being selected so that the analog current passing through said sampling impedance is a desired non-linear function of said binary input information.

2. An electrical decoder means comprising a source of binary electrical input information, a source of D.C. voltage, a sampling impedance having one terminal connected to said source of D.C. voltage, a variable resistance network connected between the other terminal of said sampling impedance and D.C. ground, said variable resistance network comprising plural parallel resistance paths, each having a diode connected therein, said diodes being oriented to be forwardly biased by said D.C. source, logic switching means responsive to said source of binary electrical information connected to one terminal of the diode within each parallel path so as to selectively back bias said diodes in accordance therewith, said variable resistance being selected so that the analog current passing through said sampling impedance is a desired non-linear function of said binary input information.

3. An electrical decoder means comprising a source of binary electrical input information, a sampling impedance, an A.C. amplifier having an input responsive to the direct current passing through said sampling impedance so as to provide an A.C. large power output voltage which is determined by the magnitude of the current passing through said sampling impedance, a variable resistance network, a source of D.C. voltage, a D.C. ground, said sampling impedance and said variable resistance network being connected in series between said source of D.C. voltage and D.C. ground, said variable resistance network comprising plural parallel resistance paths, each having a diode connected therein, said diodes being oriented to be forwardly biased by said D.C. source, logic switching means responsive to said source of binary electrical information connected to one terminal of said diodes in each parallel path so as to selectively back bias said diodes in accordance therewith, said total variable resistance being selected so that the analog current passing through said sampling impedance is a desired non-linear function of said binary electrical input information, said variable resistance network appearing as a low impedance to said sampling impedance.

4. An electrical decoder means comprising a source of binary electrical input information, a sampling impedance, a variable resistance network, a source of D.C. voltage, a D.C. ground, said sampling impedance and said variable resistance network being connected in series between said source of D.C. voltage and said D.C. ground, said variable resistance network comprising plural parallel resistance paths, each having a diode connected therein, said diodes being oriented to be forwardly biased by said D.C. source, logic switching means responsive to said source of binary electrical information connected to one terminal of the diode within each parallel path so as to selectively back bias said diodes in accordance therewith, said total variable resistance being selected so that the analog current passing through said sampling impedance is a desired non-linear function of said binary input information, said logic switching means comprising plural bistable switching means corresponding in number to the number of orders of significance contained within said source of binary electrical information, each of said bistable switching devices having a voltage at its output equal to the voltage level at said source of D.C. voltage during one binary condition and an output equal to D.C. ground during the other binary condition and said number of plural parallel resistance paths within said variable resistance network being equal in number to the maximum number of decimal numbers which may be represented by said binary coded source.

5. An electrical decoder means comprising a source of binary electrical input information, a sampling impedance, a variable resistance network, a source of D.C. voltage, a D.C. ground, said sampling impedance and said variable resistance network being connected in series between said source of D.C. voltage and D.C. ground, said variable resistance network comprising six parallel resistance paths, each having a diode connected therein, said diodes oriented to be forwardly biased by said D.C. source, a first, second and third electronic latching circuit, each being responsive to a source of binary electrical information having three binary orders of significance, each of said electrical latch means providing an output voltage equal to said source of D.C. voltage during one bistable condition and an output voltage equal to D.C. ground during the other bistable condition, the output of said first latch means being connected to back bias the said diode in said first, second, fourth and seventh parallel resistance path, the output of said electrical latch means being connected to selectively back bias said diodes in said second, third and sixth resistance path, the output of said third latch means being connected to selectively back bias the diode in said fourth, fifth, six and seventh resistance path said total variable resistance being selected so that the analog current passing through said sampling impedance is a desired non-linear function of said binary input information.

6. An electrical decoder means comprising a source of binary electrical input information, a sampling impedance, a variable resistance network, a source of D.C. voltage, a D.C. ground, said sampling impedance and said variable resistance network being connected in series between said source of D.C. voltage and D.C. ground, said variable resistance network comprising six parallel resistance paths, each having a diode connected therein, said diodes oriented to be forwardly biased by said D.C. source, a first, second and third electronic latching circuit, each being responsive to a source of binary electrical information having three binary orders of significance, each of said electrical latch means providing an output voltage equal to said source of D.C. voltage during one bistable condition and an output voltage equal to D.C. ground during the other bistable condition, the output of said first latch means being connected to back bias the said diode in said first, second, fourth and seventh parallel resistance path, the output of said second electrical latch means being connected to selectively back bias said diodes in said second, third and sixth resistance path, the output of said third latch means being connected to selectively back bias the diode in said fourth, fifth, six and seventh resistance path, and each of said connections from said electronic latches to said parallel resistance paths including a diode which is forwardly biased by the output of said latches corresponding to a binary zero, said digital variable resistance being selected so that the analog current passing through said sampling impedance is a desired non-linear function of said binary input information.

7. A digital to A.C. voltage converter comprising a source of binary electrical input information, a D.C. voltage source, a magnetic amplifier with A.C. output winding means, a first control winding means within said magnetic amplifier variably controlling the amplitude of the A.C. voltage output of said amplifier with a first phase, a second control winding within said amplifier for variably controlling the amplitude of the A.C. voltage output of said amplifier with the other phase, means for selectively energizing one terminal of said control winding from said D.C. voltage source, a variable impedance network comprising plural parallel resistance paths, each having a diode connected therein; said diodes being oriented to be forwardly biased by said D.C. source, one terminal of said variable impedance network being connected to the other terminal of each of said control windings, the other terminal of said variable impedance network connected to D.C. ground, logic switching means responsive to said source of binary electrical information connected to one terminal of the diode within each parallel path so as to selectively back bias said diodes in accordance therewith, said total variable resistance paths being selected so that the analog current passing through said sampling impedance is a desired non-linear function of said binary input information.

8. An electrical decoder means comprising a source of binary electrical input information, a sampling impedance, an A.C. amplifier having an input responsive to the direct current passing through said sampling impedance so as to provide an A.C. large power output voltage which is determined by the magnitude of the current passing through said sampling impedance, a variable resistance network, a source of D.C. voltage, a D.C. ground, said sampling impedance and said variable resistance network being connected in series between said source of D.C. voltage and D.C. ground, said variable resistance network comprising plural parallel resistance paths, each having a diode connected therein, said diodes being oriented to be forwardly biased by said D.C. source, logic switching means responsive to said source of binary electrical information connected to one terminal of said diodes in each parallel path so as to selectively back bias said diodes in accordance therewith, said total variable resistance being selected so that the analog current passing through said sampling impedance is a desired non-linear function of said binary electrical input information.

References Cited in the file of this patent

UNITED STATES PATENTS 2,658,139 Abate ---------------- Nov. 3, 1953

2,775,754 Sink ----------------- Dec. 25, 1956